T. D. MILLER.
CAN DEHEADING MACHINE.
APPLICATION FILED OCT. 8, 1912.

1,058,379.

Patented Apr. 8, 1913.
3 SHEETS—SHEET 1.

WITNESSES

INVENTOR
T. D. Miller
By Watson Bayden
Attorney

T. D. MILLER.
CAN DEHEADING MACHINE.
APPLICATION FILED OCT. 8, 1912.

1,058,379.

Patented Apr. 8, 1913.
3 SHEETS—SHEET 2.

Witnesses
C. N. Walker.
A. H. Norris.

Inventor
T. D. Miller
By Watson Boyden
Attorney

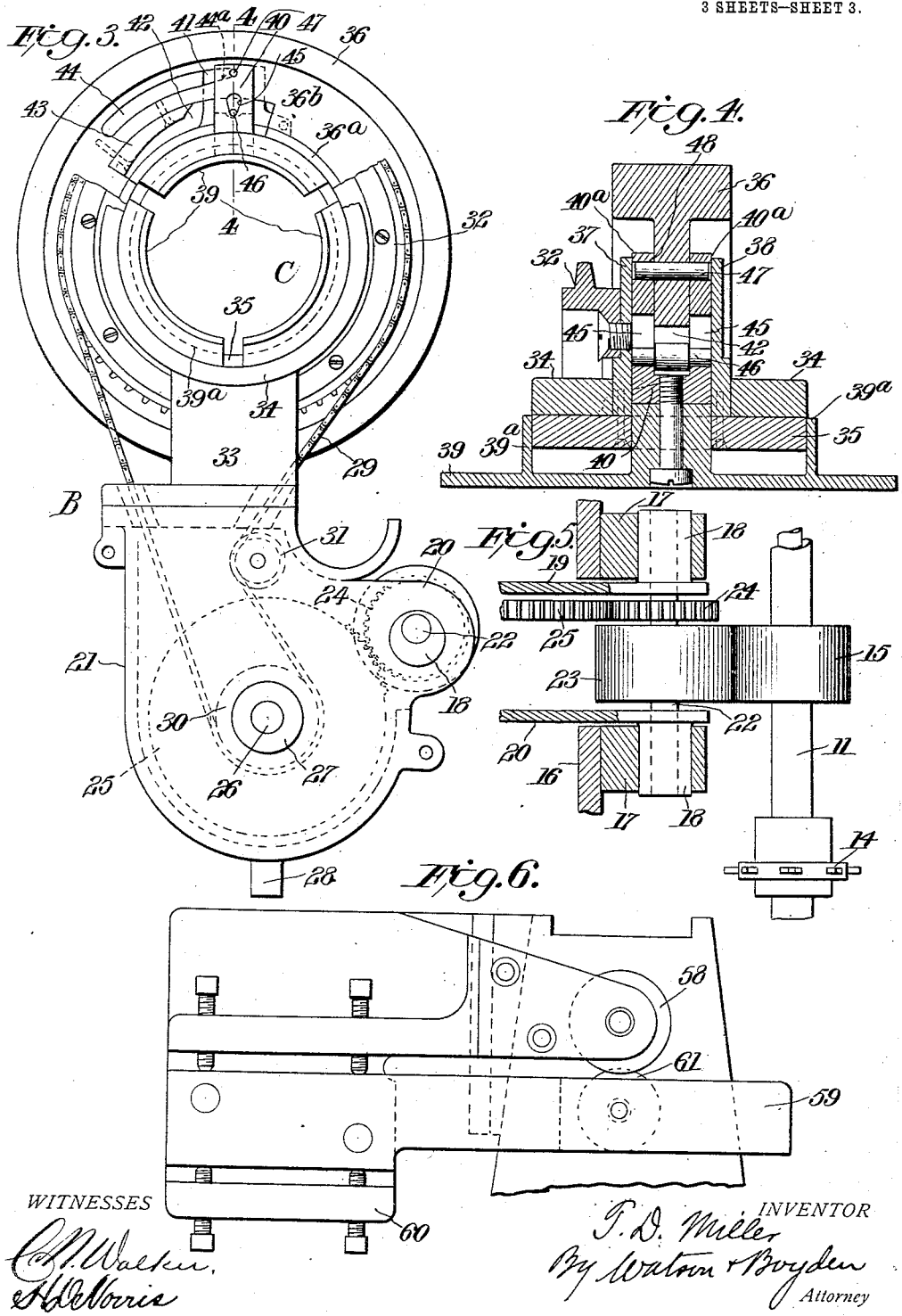

UNITED STATES PATENT OFFICE.

THOMAS D. MILLER, OF CATONSVILLE, MARYLAND.

CAN-DEHEADING MACHINE.

1,058,379.     Specification of Letters Patent.     Patented Apr. 8, 1913.

Application filed October 8, 1912. Serial No. 724,600.

*To all whom it may concern:*

Be it known that I, THOMAS D. MILLER, a citizen of the United States, residing at Catonsville, in the county of Baltimore and State of Maryland, have invented certain new and useful Improvements in Can-Deheading Machines, of which the following is a specification.

The purpose of this invention is to provide a simple form of mechanism for removing the heads and seams from tin cans which have been used to contain foodstuffs, in order that the bodies of the cans may be saved for various purposes for which they are found useful, such as the manufacture of roofing caps and shingles.

Figure 1:
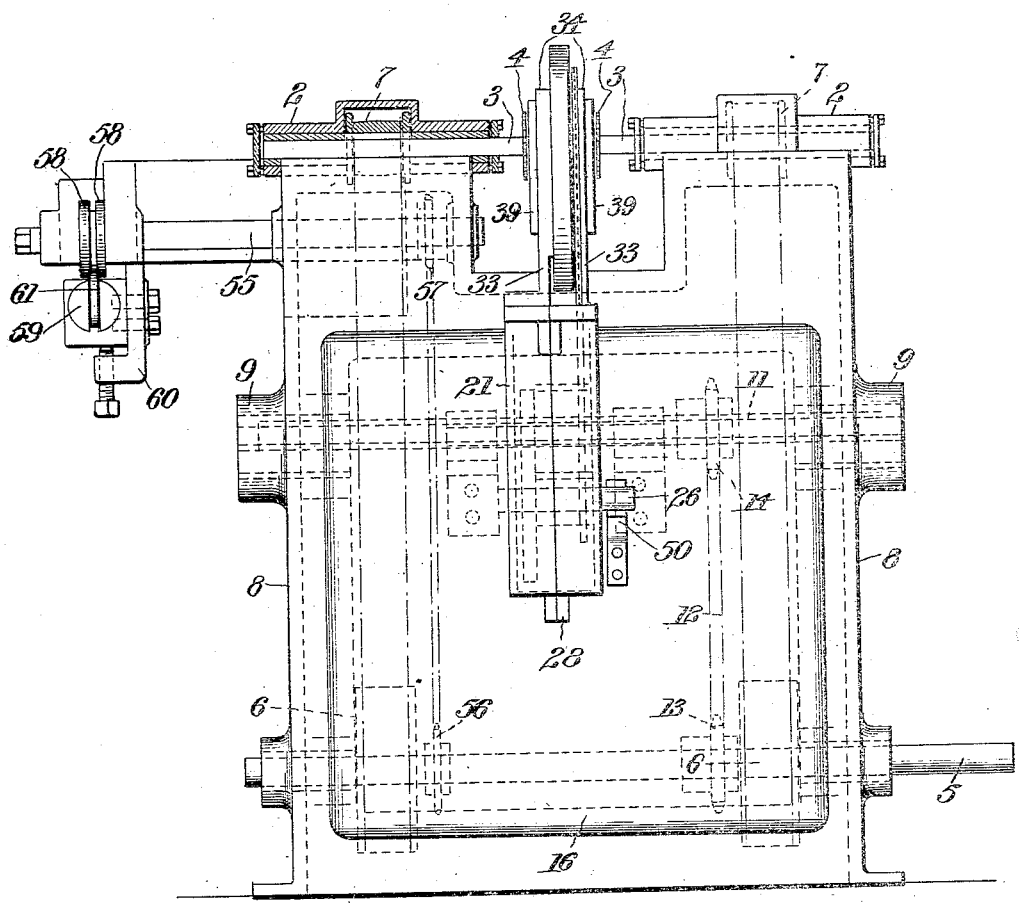
Figure 2:
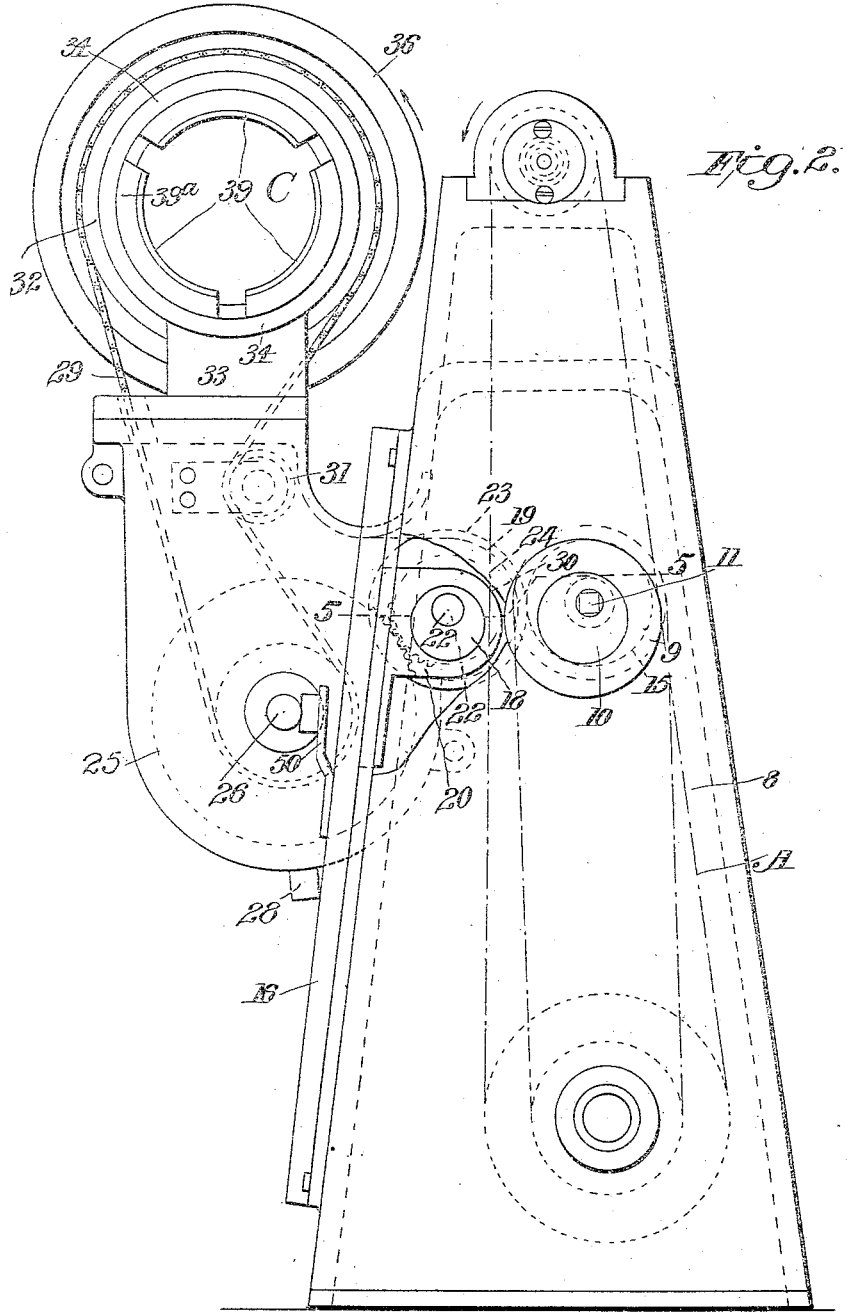

In the accompanying drawing, Figure 1 is a front elevation, partly in section, of the can deheading machine; Fig. 2 is a side elevation of the machine; Fig. 3 is a side elevation, partly broken away, of the can clamp or chuck and the chuck support; Fig. 4 is a section on the line 4—4 of Fig. 3; Fig. 5 is a section on the line 5—5 of Fig. 2; and, Fig. 6 is a side view of the slitter for removing the seams from the cans.

Referring to the drawing, A indicates a suitable supporting frame, upon the top of which are mounted, in bearings 2, a pair of alined saw arbors 3, carrying at their adjacent ends circular saws 4. These saws are constantly driven from a main shaft 5, having drive pulleys 6 thereon, which are belted to pulleys 7 on the saw arbors, one of these pulleys being shown at the left in Fig. 1. The sides 8 of the frame are provided with bearings 9 in which are mounted eccentric bushings 10, and within these bushings is journaled a tubular counter-shaft 11 which is constantly driven by a sprocket chain 12 and sprocket wheels 13 and 14, from the main shaft 5, and on the shaft 11 is arranged a friction pulley 15. Upon the main frame A is secured a rectangular front piece 16, having on its rear face bearings 17 in which are mounted trunnions 18 which project laterally in opposite directions from ears 19 and 20 on the gear casing 21. A shaft 22 is eccentrically mounted in the trunnions 18 and this shaft carries a friction pulley 23 adapted to engage a friction pulley 15. It also carries a gear 24 which meshes with a gear 25 mounted upon a shaft 26, which latter is journaled in suitable bearings 27 in the sides of the gear casing. The gear casing is thus pivotally connected by the trunnions 18 to the front plate of the machine, and a projection 28 on the bottom of the casing, which is adapted to engage the front plate, forms a stop to limit the movement of the casing in one direction. The eccentric mounting of the shaft 11, in the bushing 10, permits of adjustment of the friction pulley 15 toward and from the friction pulley 23, and as the shaft 22 is eccentrically mounted with respect to the pivotal axis of the gear casing, it is evident that when the gear casing is rocked in one direction, the friction wheels will engage and when rocked in the opposite direction, the friction wheels will be disengaged, and that an engagement of the friction wheels may be arranged to take place at any desired point in the movement of the gear casing. This gear casing 21 forms part of a support B for a can clamp or chuck C, which is movable with the support in a plane between the saws 4, toward and from the saws.

When moved away from the saws, as shown in Fig. 2, the friction wheels 15 and 23 are disengaged; but when the chuck is moved so that a can held therein engages the saws, the friction wheels engage one another and the chuck is rotated in a direction opposite to the direction of rotation of the saws through the medium of a sprocket chain 29 which passes around a sprocket wheel 30 on the shaft 26, and around an idle sprocket 31, in the gear casing, and around a sprocket wheel 32 associated with the chuck. As shown in the drawing, a pair of uprights 33 are secured to the top of the gear casing 21 and integral with these uprights are rings 34 within which is rotatably mounted a sleeve 35. Between the rings 34, a fly wheel 36 is rotatably mounted upon the sleeve 35, and between the hub-rim 36ª of the fly wheel and the rings 34 are mounted annular plates 37 and 38 which are secured to the sleeve 35. The sprocket wheel 32 is secured to the plate 37, so that when the sprocket wheel is turned the annular guide plates 37 and 38 and the sleeve 35 are positively driven thereby, while the fly wheel 36 is free to turn, to a limited extent, upon the sleeve 35. Three similar arcuate clamping members 39 are arranged within the sleeve 35 and are provided with guiding flanges 39ª which bear against the ends of said sleeve. These clamping members are provided with radially arranged stems 40 which are bifurcated and the two arms 40ª of the stem are at opposite sides of the web 36^b of the fly wheel and are guided by the face plates 37 and 38 and guiding ribs 41 on the inner sides of said face plates. Adjacent to each clamping member, the web of the fly wheel is cut away, as shown at 42, and within this opening is arranged a cam 43. Near the rim of the fly wheel the web has also a cam slot 44. The forks of the stem 40 are provided with longitudinal slots 45 which register with the slot 42 in the web of the fly wheel, and a pin 46 extends through the slots 45 and the slot 42, this pin being held within the slots by the face plates 37 and 38. Another pin 47 extends through openings 48 in the forks 40^a and through the cam slot 44 in the web of the wheel.

In operation the main shaft 5 and the saws are constantly rotated in the direction of the arrows Fig. 2. The chuck support is normally in the position shown in said figure, with the friction wheels 15 and 23 disengaged. The can is placed between the jaws 39 of the chuck, with its ends protruding into the planes of the saws 4. The operator then manually presses the chuck support rearwardly and the latter is thereby swung about the trunnions 18 as a center, to carry the can into engagement with the saws and the friction wheels 15 and 23 are also, by this movement, brought into engagement with one another just before the can body engages the saws. This engagement of the friction wheels causes the sprocket 32 and the sleeve 35 and face plates 37 and 38, which carry the clamping members 39, to revolve in the direction indicated by the arrow, these parts being positively driven by the sprocket chain. The fly wheel, owing to its inertia and the fact that it is loosely mounted on the sleeve 35, lags behind the positively driven parts and the pins 46 and 47 are carried by the stems of the clamping members around in the slots 42 and 44, respectively, the pin 46 of each clamping member passing under a cam 43, and the clamping members are thereby automatically forced against the can. The pins being then wedged between the stems of the clamping members and the cams 43, the fly wheel is then carried around with the sprocket wheel and other connected parts while the saws cut off the can heads. When the heads have been severed from the can bodies, the operator allows the chuck and its support to swing back by gravity to normal position and the friction wheels are thereby disengaged and the shaft 26 is brought into engagement with a brake 50 secured to the front plate of the machine, which quickly stops the rotation of the sprocket wheel and clamping members. The inertia of the fly wheel 36, however, carries the latter around on the sleeve 35 and the cams 43 pass out of engagement with the pins 46, thereby allowing the clamping members to be moved out of engagement with the can body by short cam surfaces 44^a at the right hand ends of the slots 44. Thus it will be evident that the clamping and unclamping of the can is automatically performed at the proper times, when the power is applied and cut off from the chuck. The point in the movement of the chuck and its support toward and from the saws at which the power is applied and cut off, may be regulated by adjusting the eccentric bushings 10 so as to bring the friction pulley 15 closer to or farther from the friction pulley 23. This adjustment is desirable in order to suit the machine for deheading cans of different diameters. The clutch should commence to rotate just before the can engages the saws and it is also desirable to regulate the depth which the saws penetrate the can bodies. The adjustment of the eccentrics 10 by adjusting the position of the pulley 15, regulates the time when the power is applied to the chuck and also the distance to which the chuck can be moved in its travel toward the saws.

While only the details of one clamping member and the cams for operating the same are shown in Figs. 3 and 4, it will be understood that the other two clamping members shown are operated in the same way and by similar means. After the heads have been removed from the can, the operator inserts another can through one side of the chuck which forces the deheaded can out at the other side. The deheaded cans are then passed through a shearing mechanism, shown in front view at the left of Fig. 1 and in side view in Fig. 6, which mechanism removes the seam from the can body so that the latter may be rolled out flat and used for various commercial purposes. This threading or slitting device comprises a shaft 55 mounted in the upper part of the frame and driven from the main shaft 5 through a chain which connects sprocket wheels 56 and 57 on the shafts 5 and 55. Upon one end of the shaft 55, two parallel cutting wheels 58 are rigidly secured and spaced apart from one another. A horn 59 is adjustably secured to a bracket 60 which is attached to the main frame, the horn being located below the cutter wheels 58. A cutter wheel 61, arranged within a slot in the horn 59 extends between the wheels 58, which fit closely against the sides of the cutter wheel 61. The distance between the wheels 58 is slightly greater than the width of a seam in an ordinary can.

It will be seen that if a can is placed upon the horn and moved endwise so as to carry its seam over the cutter wheel 61, the seam will be removed from the can body, and the body may then be passed through suitable rollers to flatten it.

What I claim is:

1. In a can deheading machine, a pair of circular cutters arranged in parallel planes, driving means for the cutters, a chuck-support, a chuck mounted therein and movable therewith toward and from the cutters in a plane between the cutters, and means controlled by the movement of the support for connecting the chuck to the driving means when the chuck-support is moved toward the cutters.

2. In a can deheading machine, a suitable frame, a pair of circular cutters mounted thereon in parallel planes, driving means for the cutters, a chuck-support pivoted to the frame and adapted to swing toward and from the cutters, a chuck rotatably mounted in said support, gearing on said support for driving the chuck, and means controlled by the movement of the chuck support for connecting said gearing with the driving means when the support is moved toward the cutters.

3. In a can deheading machine, a suitable frame, a pair of circular cutters mounted thereon in parallel planes, a chuck-support pivoted to the frame and movable toward and from the cutters, a chuck rotatably mounted on the support, a friction wheel on the support and gearing connecting said wheel with the chuck, a friction wheel on the frame adapted to be engaged by the friction wheel on the support when the latter is moved toward the cutters, and to be disengaged therefrom when the support is moved away from the cutters, and means for driving the cutters and the friction wheel on the frame.

4. In a can deheading machine, a suitable frame, a pair of circular cutters mounted thereon in parallel planes, a chuck-support pivoted to the frame and movable toward and from the cutters, a chuck rotatably mounted on the support, a friction wheel on the support and gearing connecting said wheel with the chuck, a friction wheel on the frame adapted to be engaged by the friction wheel on the support when the latter is moved toward the cutters, and to be disengaged therefrom when the support is moved away from the cutters, means for driving the cutters and the friction wheel on the frame, and a brake for stopping the rotation of the chuck when the support is moved away from the cutters.

5. In a can deheading machine, a suitable frame, a pair of circular cutters mounted thereon in parallel planes, a chuck support movable toward and from the cutters, a chuck rotatably mounted in said support, means for rotating said chuck and cutters, and means for automatically closing said chuck when the latter is moved toward the cutters and for opening it when moved away from the cutters.

6. In a can deheading machine, a suitable frame, a pair of circular cutters mounted thereon in parallel planes, a chuck support movable toward and from the cutters, a chuck rotatably mounted in said support, a fly wheel on said support having a limited movement with respect to the clamping members of the chuck, cams movable by the fly wheel for closing and opening the clamping members, means for driving the cutters and means for connecting the chuck with the driving means when the support is moved toward the cutters and for disconnecting the chuck from the driving means when the support is moved away from the cutters.

7. In a can deheading machine, a suitable frame, a pair of circular cutters mounted thereon in parallel planes, a chuck support movable toward and from the cutters, a chuck rotatably mounted in said support, a fly wheel on said support having a limited movement with respect to the clamping members of the chuck, cams movable by the fly wheel for closing and opening the clamping members, means for driving the cutters, means for connecting the chuck with the driving means when the support is moved toward the cutters and for disconnecting the chuck from the driving means when the support is moved away from the cutters, and a brake arranged to stop the rotation of the chuck when the support is moved away from the cutters.

8. In a can deheading machine, a suitable frame, a pair of circular cutters mounted thereon in parallel planes, means for driving the cutters, a counter shaft mounted in eccentric bushings in the frame, a friction pulley on said counter shaft, a chuck support pivotally connected to the frame, a shaft in said support, a friction pulley on the latter shaft and a chuck on the support geared to the latter pulley.

9. In a can deheading machine, a suitable frame, a pair of circular cutters mounted thereon in parallel planes, means for driving the cutters, a counter shaft mounted in eccentric bushings in the frame, a friction pulley on said counter shaft, a chuck support pivotally connected to the frame, a shaft in said support eccentrically mounted with respect to the pivotal axis of the support, a friction pulley on the latter shaft and a chuck on the support geared to the latter pulley.

In testimony whereof I affix my signature, in presence of two witnesses.

THOMAS D. MILLER.

Witnesses:
SILAS V. KEMP,
JABEZ P. KEMP.